United States Patent [19]
Altmann

[11] 3,822,091
[45] July 2, 1974

[54] AUTOMATIC FOCUSING APPARATUS

[75] Inventor: Conrad Altmann, Rochester, N.Y.

[73] Assignee: Eastman Kodak Company, Rochester, N.Y.

[22] Filed: Apr. 13, 1973

[21] Appl. No.: 351,113

[52] U.S. Cl. .................................. 353/69, 353/101
[51] Int. Cl. ..................... G03b 3/02, G03b 3/10
[58] Field of Search ...................... 353/69, 100, 101

[56] References Cited
UNITED STATES PATENTS

| | | | |
|---|---|---|---|
| 2,947,215 | 8/1960 | Mitchell | 353/101 |
| 3,562,785 | 2/1971 | Craig | 353/101 |
| 3,628,863 | 12/1971 | Kettler | 353/101 |

FOREIGN PATENTS OR APPLICATIONS

| | | | |
|---|---|---|---|
| 697,612 | 11/1965 | Italy | 353/101 |
| 946,782 | 1/1964 | Great Britain | 353/101 |

*Primary Examiner*—Louis R. Prince
*Assistant Examiner*—A. Jason Mirabito
*Attorney, Agent, or Firm*—William F. Noval

[57] ABSTRACT

In image projection apparatus having an optical axis, automatic focusing apparatus maintaining the focus of an image projected along said axis from an image bearing medium irrespective of changes in location of the image layer of such medium. The apparatus includes an image bearing medium support including a pair of transparent members which hold the image bearing medium substantially flat. The opposing surfaces of the transparent members are provided with transparent conductive coatings adapted to contact the image bearing medium held between the members. Light from an illuminating source is transmitted through the image bearing medium and heats up the image layer of a supported medium. The conductive coatings in contact with the image layer will also heat up effecting a change in the electrical resistance thereof. The conductive coatings are part of an electrical circuit which develops a signal representative of the location of the heated image layer. This signal may be used in a variety of ways to adjust the focal distance to maintain the projected image in focus. In a preferred embodiment the signal is applied to a rotary solenoid to alternately position an optical compensating member into and out of the optical axis of the image projector.

5 Claims, 5 Drawing Figures

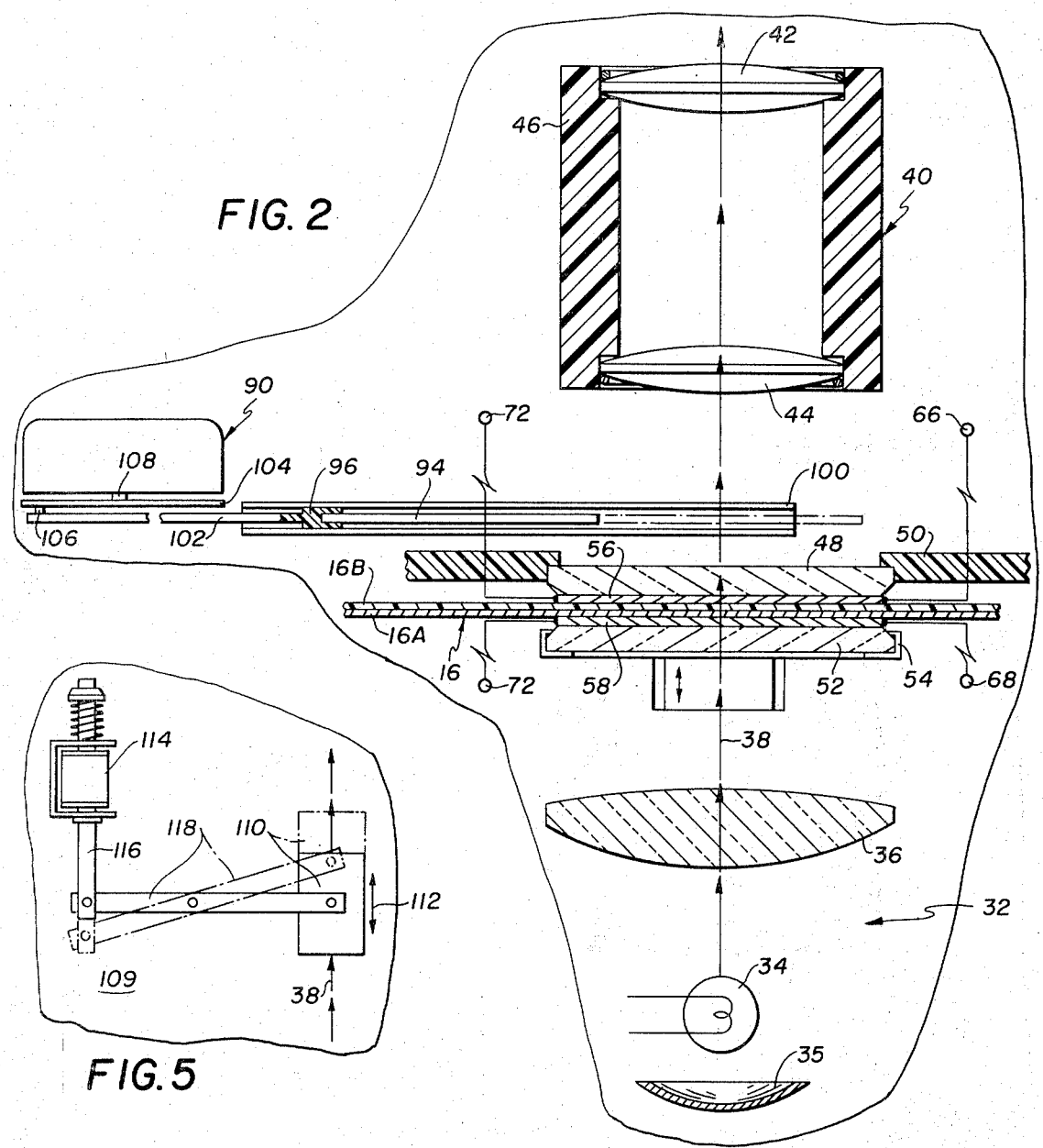
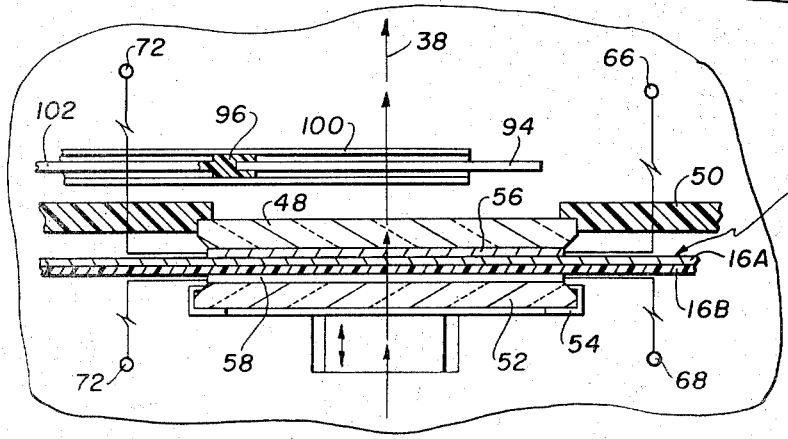

AUTOMATIC FOCUSING APPARATUS

BACKGROUND OF THE INVENTION

1. Field of the Invention

This invention relates generally to image projection apparatus and more particularly to method and apparatus in image projection apparatus for determining the location of the image layer of an image bearing medium supported relative to an optical axis of the apparatus and for automatically changing image projection optics to compensate for changes in location of the image layer of such a supported medium.

2. Description of the Prior Art

In image projection apparatus such as microfilm readers, motion picture projectors and the like it is often the case that the location of the emulsion or image layer of an image bearing medium supported in the optical axis of the apparatus for image projection will vary from medium to medium. Since the image layer must be in the focal plane of the projection optics of the apparatus, variation of location of the image layer from medium to medium will necessitate focal changes in the projection optics to compensate for such variation. The necessity for making focal changes increases as the thickness of the image bearing medium increases or as the blow up from the image bearing medium increases. Prior art systems for automatically focusing the projection optics have generally involved complex and expensive systems and have added substantial cost to the image projector. In addition, most such prior art systems are only suitable for making automatic focal changes when the image bearing medium is physically deformed or buckled due to heating of the film. Thus, systems which utilize changes in fluid pressure caused by changes in distance between the image bearing medium surface and a reference surface to effect focal changes and systems which use photosensitive cells to detect variations in a reflected light source caused by deflection of the image bearing medium to effect focal changes are useful for the detection of such deflections but are unsuitable for effecting focal changes due to changes in location of the image layer of the image bearing medium.

SUMMARY OF THE INVENTION

Thus, an object of the present invention is to provide automatic focusing method and apparatus for image projection apparatus which will automatically effect focal changes in the projection optics of the projection apparatus as a function of the location of the image layer of an image bearing medium supported by the apparatus.

In general, according to one aspect of the present invention, there is provided in image projection apparatus having an optical axis, automatic focusing apparatus comprising support means positioned along said optical axis for supporting an image bearing medium having an image layer; focusable projection means positioned along said optical axis for projecting a focused image from said image bearing medium along said axis; illuminating means for illuminating a supported medium with light whereby the image layer thereof is heated up through absorption of light by said layer; heat sensing means for sensing the heated image layer of the supported medium and for developing a signal representative of the location of the image layer; and control means responsive to said signal for controlling said projection means to thereby change the focus of said projection means as a function of the location of the image layer of the supported medium.

According to another aspect of the present invention there is provided a method of automatically maintaining the focus of an image projected by focusable projection means along an optical axis of projection apparatus comprising the steps of: supporting an image bearing medium having an image layer along said optical axis; illuminating said image bearing medium with light whereby said image layer is heated up through absorption of light; sensing the location of the heated image layer and producing an electrical signal representative of the location of said layer; and focusing a focusable projection means positioned along said optical axis as a function of said electrical signal.

The invention and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings in which:

FIG. 2 is a partially sectional top plan view of a portion of the apparatus of FIG. 1 showing a co-plano optical member out of the optical axis of the projection apparatus;

FIG. 3 is a partially sectional top plan view of a portion of the apparatus of FIG. 1 showing the co-plano member in the optical axis of the projection apparatus;

FIG. 5 is a perspective view showing focusing of a projection lens according to the automatic focusing method and apparatus of the present invention.

DESCRIPTION OF THE PREFERRED EMBODIMENTS

Because photographic apparatus are well known, the present description will be directed in particular to elements forming part of, or cooperating more directly with, the present invention, apparatus not specifically shown or described herein being understood to be selectable from those known in the art.

Figure 1:
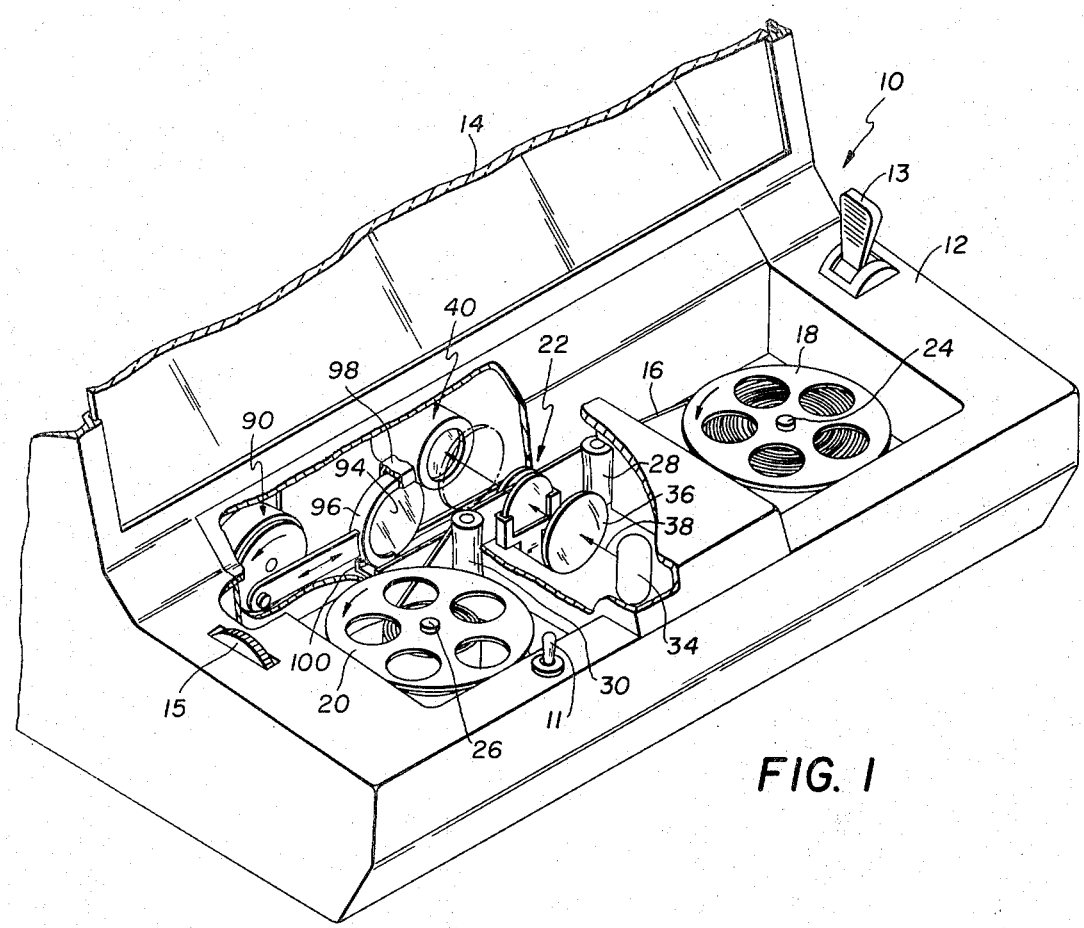
FIG. 1 is a perspective view of image projection apparatus such as a microfilm reader in which the automatic focusing apparatus of the present invention may be used.

Referring now to FIGS. 1–3 there is shown image projection apparatus in which the automatic focusing apparatus of the present invention may be used. As shown, image projection apparatus such as microfilm reader 10 comprises a housing 12 having a projection screen 14 upon which enlarged images from image bearing medium 16 may be displayed. Image bearing medium 16, may, as shown, be an elongate strip of microfilm which extends between supply reel 18 and take-up reel 20 through a projection gate 22. Reels 18 and 20 are respectively rotatably mounted on reader 10 by shafts 24 and 26. Guide rollers 28 and 30 are provided to guide microfilm 16 past projection gate 22. An illumination means 32 which includes illumination source 34, reflector 35 (FIG. 2) and light condensing lens 36 directs a light beam along optical axis 38 to illuminate microfilm 16 at projection gate 22 to form an image which is projected along optic axis 38 by means of projection lens assembly 40. Assembly 40 may include lens elements 42 and 44 mounted in lens barrel 46.

As shown more clearly in FIG. 2, projection gate 22 includes a stationary transparent member 48 mounted on bracket 50 and a transparent member 52 mounted on a bracket 54 which is mounted for movement toward and away from bracket 50. When microfilm 16 is transported past projection gate 22 either in fast forward or fast reverse or at a slower scanning speed transparent member 52 is moved away from member 48 to prevent scratching and tearing of microfilm 16 as it passes between members 48 and 52. When it is desired to display an image from microfilm 16 onto screen 14, member 52 is closed to thereby hold microfilm 16 substantially flat so that the image layer thereof is held in a focal plane of projection lens 40 whereby a focused image is projected onto screen 14.

Microfilm 16 generally includes a base or support layer 16A and an emulsion or image layer 16B. Since the location of the image layer in the projection gate will have an effect on the focus of the enlarged image projected onto the reader screen, it is desirable that the projection optics be automatically focused as the location of the image layer changes with different reels of microfilm used with reader 10. Such focal variations caused by the location of the image layer in the projection gate will become more pronounced with increased thickness of the microfilm and with increased enlargement of the microimage.

Automatic focusing apparatus for automatically focusing the reader projection optics with change in location of the image layer will now be described. In order to determine the location of the image layer in the projection gate 22 the opposing inner surfaces of transparent members 48 and 52 are respectively provided with transparent electrical resistance layers 56 and 58. Layers 56 and 58 are of resistive material whose resistance changes with heat and are in physical contact with film 16 when members 48 and 52 are closed. Since the support layer 16A of film 16 is normally substantially transparent it will absorb little light directed through the film and therefore will not heat up appreciably. However, since the emulsion layer 16B is provided with image areas of greater optical density than the support layer, image layer 16B will absorb considerably more light radiation than support layer 16A and will therefore heat up substantially more than the support layer. Consequently, the resistive layer in contact with the image layer will undergo a detectable change in resistance since it will be heated up by the image layer and through appropriate detection circuitry the difference in resistance between the resistive layer in contact with the image layer and the resistance in contact with the support layer may be utilized to effect focal changes in the projection optics of the microfilm reader.

Figure 4:
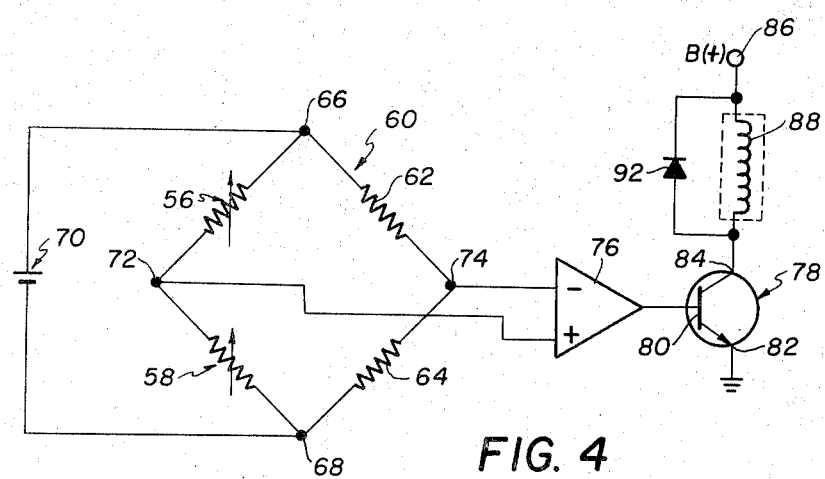
FIG. 4 is a schematic electrical diagram of a control circuit which may be used according to the present invention to effect focal changes in the projection optics of image projection apparatus such as shown in FIG. 1.

A suitable detection and control circuit is shown in FIG. 4. As shown, resistive layers 56 and 58 are respectively connected in two arms of a Wheatstone bridge 60, resistive layer 56 being connected between terminals 66 and 72 and resistive layer 58 being connected between terminals 72 and 68. Wheatstone bridge 60 is also provided with fixed resistors 62 and 64 in the other legs thereof, resistor 62 being connected between terminals 66 and 74 and resistor 64 being connected between terminals 74 and 68. Connected across terminals 66 and 68 of bridge 60 is a voltage source such as battery 70. The output of bridge 60 is taken from terminals 72 and 74 and connected respectively to the positive and negative input terminals of operational amplifier 76. The output of operational amplifier 76 is connected to a control circuit which may include a transistor 78 having a base 80 connected to the output of operational amplifier 76. Emitter 82 of tansistor 78 is connected to ground and connected between collector 84 of transistor 78 and B+ terminal 86 are solenoid coil 88 and diode 92 connected in parallel therewith. Solenoid coil 88 may form part of a rotary solenoid 90 as shown in FIGS. 1–3 or part of a linear solenoid as shown in FIG. 5.

As shown in FIGS. 1–3, solenoid 90 is linked to coplano optical member 94 which is movable into and out of optical axis 38. Member 94 is mounted by member 96 for sliding movement in tracks 98 and 100 of reader 10.

Member 96 is linked to solenoid 90 by means of linkage member 102 pinned to a disk member 104 by a pin 106. Member 104 is mounted on rotatable shaft 108 of solenoid 90.

The operation of the apparatus of FIGS. 1–4 is as follows: An operator using reader 10 would initially turn the power on through power switch 11 to supply power to lamp 34 and to energize the motor control circuit (not shown) driving shafts 24 and 26. The operator would place reel 18 of microfilm on shaft 24 and thread it through projection gate 22 onto take up reel 20. The operator would then operate forward and reverse switch 13 to cause microfilm 16 to be transported past projection gate 22 so that images on microfilm 16 may be displayed on screen 14 in a scanning mode. During this scanning operation transparent gate members 48 and 52 will be open to avoid tearing of microfilm 16.

When it is desired to inspect a particular image, the operator would stop transport of microfilm 16 at the desired image by moving switch 13 to the neutral position and through appropriate control circuitry (not shown) member 52 would be closed so that film 16 will be supported in a flat condition with the image layer thereof supported in a plane. If the image layer 16B is located on film towards lens assembly 40 (as shown in FIGS. 1 and 2), resistive layer 56 will be in contact with layer 16B. Through heating of layer 56 by heated image layer 16B, the control circuit of FIG. 4 will cause coplano member 94 to be moved out of optical axis 38 so that lens assembly 40 will project a focused image onto screen 14. Fine focusing may be effected by means of focusing wheel 15 as is well known in the art.

If a new reel of microfilm should be inserted into reader 10 and image layer 16B is located away from the projection lens (as shown in FIG. 3), resistive layer 58 will be in contact with image layer 16B and the imbalance signal produced by the heating of resistor 58 will cause the control circuit of FIG. 4 to move member 94 into optical axis 38 to effect focal changes in the projected image so that it will be automatically projected in focus onto screen 14.

As shown in FIG. 5, the focus control signal developed by the circuit of FIG. 4 may be utilized to directly change the position of the projection lens assembly. As shown, projection lens assembly 110 is similar to assembly 40 and is mounted on image projection apparatus 109 for movement along optical axis 38 in the directions of double headed arrow 112. A linear solenoid 114 has an acutating arm 116 linked to assembly 110 by pivotally mounted lever arm 118. Solenoid coil 88 will cause solenoid 114 to move lens assembly 110 to the position shown in solid lines or to the position shown in dashed lines as a function of the imbalance signal developed by bridge 60, as described in greater detail hereinabove.

Thus it is seen that there is provided automatic focusing apparatus for image projection apparatus which automatically effects focal changes in the projection optics of the projection apparatus as a function of the location of the image layer of a supported image bearing medium.

The invention has been described in detail with particular reference to preferred embodiments thereof, but it will be understood that variations and modifications can be effected within the spirit and scope of the invention.

I claim:

1. In image projection apparatus having an optical axis, the combination comprising:

support means positioned along said optical axis for supporting an image bearing medium having an image layer;

focusable projection means positioned along said optical axis for projecting a focused image from said image bearing medium along said axis;

illuminating means for illuminating a supported medium with light whereby the image layer thereof is heated up through absorption of light by said layer;

heat sensing means responsive to the heat from the heated image layer of the supported medium for developing a signal representative of the location of the image layer; and control means responsive to said signal for controlling said projection means to thereby change the focus of said projection means as a function of the location of the image layer of the supported medium.

2. The combination of claim 1 wherein said projection means includes a co-plano transparent member movable between a first position wherein said transparent member is out of the optical axis and a second position wherein said transparent member is in the optical axis and wherein said control means includes means for moving said co-plano member between said first and said second positions in response to said signal developed by said heat sensing means.

3. The combination of claim 1 wherein said support means includes a pair of transparent members which support an image bearing medium substantially flat and wherein said heat sensing means includes transparent electrically conductive layers on opposing inner surfaces of said transparent members, said electrically conductive layers being in contact with said image bearing medium when the medium is supported substantially flat.

4. The combination of claim 1 wherein said focusing means includes a projection lens movably mounted for movement along said optical axis and wherein said control means includes means for moving said projection lens as a function of the location of the image layer of an image bearing medium supported by said support means.

5. A method of automatically maintaining the focus of an image projected by focusable projection means along an optical axis of projection apparatus comprising:

supporting an image bearing medium having an image layer along said optical axis;

illuminating said image bearing medium with light whereby said image layer is heated up through absorption of light;

sensing the location of the heated image layer and producing an electrical signal representative of the location of said layer; and focusing the focusable projection means positioned along said optical axis as a function of said electrical signal.

* * * * *